(12) United States Patent
Talai

(10) Patent No.: US 11,668,791 B2
(45) Date of Patent: Jun. 6, 2023

(54) METHOD FOR PREDICTING A FALSE POSITIVE FOR A RADAR SENSOR

(71) Applicant: APTIV TECHNOLOGIES LIMITED, St. Michael (BB)

(72) Inventor: Armin Talai, Nuremberg (DE)

(73) Assignee: APTIV TECHNOLOGIES LIMITED, St. Michael (BB)

( * ) Notice: Subject to any disclaimer, the term of this patent is extended or adjusted under 35 U.S.C. 154(b) by 442 days.

(21) Appl. No.: 16/881,259

(22) Filed: May 22, 2020

(65) Prior Publication Data

US 2020/0400780 A1 Dec. 24, 2020

(30) Foreign Application Priority Data

Jun. 19, 2019 (EP) ..................................... 19181196

(51) Int. Cl.
*G01S 7/40* (2006.01)
*G01S 7/41* (2006.01)

(52) U.S. Cl.
CPC .................. *G01S 7/40* (2013.01); *G01S 7/411* (2013.01)

(58) Field of Classification Search
CPC ......... G01S 13/931; G01S 2013/93271; G01S 17/931; G01S 2013/93272; G01S 7/414; G01S 7/417; G01S 7/411; G01S 7/4802; G01S 7/02; G01S 2013/9327; G01S 2015/938; G01S 7/4052; G01S 7/4056; G01S 2013/93275; G01S 13/06; G01S 7/418; G01S 13/58; G01S 7/41; G01S 7/2927; G01S 13/04; G01S 13/56; G01S 7/415; G01S 7/292; G01S 7/40; G06N 20/00; G06N 7/00; G06V 20/56; G06F 9/455; B60W 2050/0083; G06K 9/6218
See application file for complete search history.

(56) References Cited

U.S. PATENT DOCUMENTS

| 2004/0027274 A1* | 2/2004 | Driessen ............... G01S 13/726 342/107 |
| 2018/0203445 A1* | 7/2018 | Micks ..................... G06F 30/20 |
| 2020/0250363 A1* | 8/2020 | Partridge ................ G06F 30/15 |

OTHER PUBLICATIONS

Extended European Search Report for Application No. 19181196.7 dated Jan. 7, 2020.

(Continued)

*Primary Examiner* — Olumide Ajibade Akonai
(74) *Attorney, Agent, or Firm* — Carlson, Gaskey & Olds, P.C.

(57) ABSTRACT

A simulation method for predicting a false positive for a predefined region outside a desired field of view of a radar sensor. Calculated primary rays having a respective primary energy level represent the radar signal. Reflected rays are calculated based on the primary rays or other reflected rays and based on geometrical data for at least one item within the predefined region. An energy level is determined for each reflected ray based on an estimated reflectivity of the at least one item and based on the primary energy level of the respective primary ray, and a clustering level for the reflected rays is determined based on distances of the respective reflection points. A probability for an occurrence of a false positive is estimated based on the energy level and the clustering level.

15 Claims, 4 Drawing Sheets

(56) References Cited

OTHER PUBLICATIONS

Figure 1:
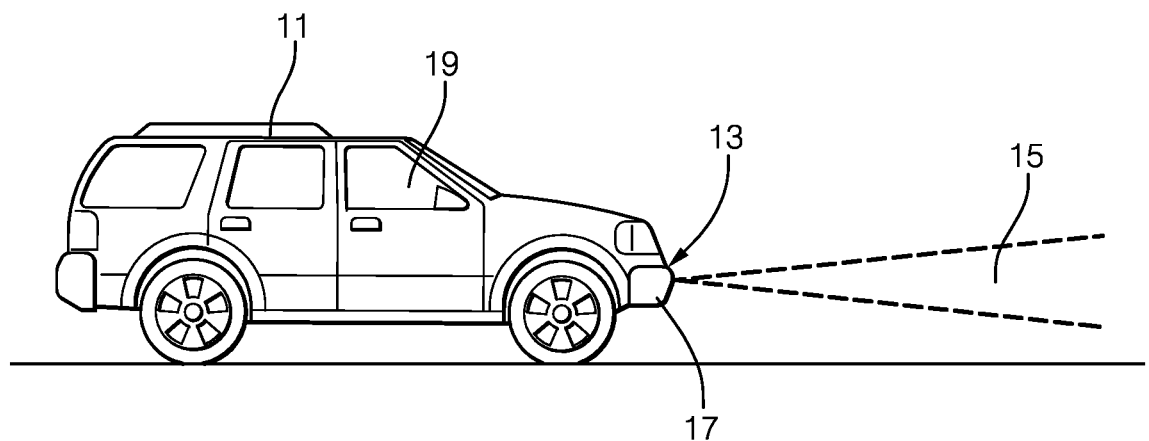

Yu C L et al: "Radar cross section computation and visualization by shooting-and-bouncing ray (SBR) technique," Proceedings of the Antennas and Propagation Society International Symposium (APSIS), Chicago, Jul. 20-24, 1992; [Proceedings of the Antennas and Propagation Society International Symposium (APSIS)], New York, IEEE, US, Jun. 18, 1992, p. 1323, XP032370072, DOI: 10.1109/APS.1992.221753; ISBN: 978-0-7803-0730-8.
Gadringer Michael Ernest et al: "Radar target stimulation for automotive applications," IET Radar Sonar Navigation, The Institution of Engineering and Technology, UK, vol. 12, No. 10, Oct. 1, 2018, pp. 1096-1103, XP006069604, ISSN: 1751-8784, DOI: 10.1049/IET-RSN.2018.5126.
Holder Martin et al: "Measurements revealing Challenges in Radar Sensor Modeling for Virtual Validation of Autonomous Driving," 2018 21st International Conference on Intelligent Transportation Systems (ITSC), IEEE, Nov. 4, 2018, pp. 2616-2622, XP033470118, DOI: 10.1109/ITSC.2018.8569423, ISBN: 978-1-7281-0321-1 [retrieved on Dec. 7, 2018].

\* cited by examiner

METHOD FOR PREDICTING A FALSE POSITIVE FOR A RADAR SENSOR

CROSS REFERENCE TO RELATED APPLICATIONS

This application claims priority to European Patent Application No. 19181196.7, filed on Jun. 19, 2019.

FIELD

The present disclosure relates to a computer implemented method for predicting a false positive for a radar sensor.

BACKGROUND

Vehicles may comprise radar sensors which are used for monitoring target objects within an environment of a vehicle. The radar sensor is configured to emit a radar signal in a desired field of view, e.g. in front of the vehicle. In addition, the radar sensor is able to receive reflected signals from the environment of the vehicle, e.g. by antennas which are part of the radar sensor. By analyzing the reflected signals, properties of objects within the environment of the vehicle may be determined, e.g. the distance and/or the velocity of the objects relative to the vehicle comprising the radar sensor.

A portion of the radar signal emitted by the radar sensor may be reflected, however, by parts of the vehicle before arriving at any object outside the vehicle in the desired field of view of the radar sensor. For example, a portion of the radar signal may be reflected by a painted bumper being mounted at the front of the vehicle. Therefore, the radar signal may partly leave the desired field of view and enter the interior of the vehicle. Within the interior of the vehicle, the radar signal being reflected by e.g. the bumper may be reflected again by parts or items located within the interior of the vehicle and finally arrive at the antennas of the radar sensor again.

If the part or item within the interior of the vehicle has a high reflectivity for the radar signal, a relatively high amount of energy of the radar signal may be detected by the antennas of the radar sensor due to the multiple reflections of the radar signal within the interior of the vehicle. Therefore, the radar sensor may falsely detect an object at a certain distance in front of the vehicle, i.e. at a distance where actually no real object is located. In other words, the radar sensor may detect a so-called "false positive" within the desired field of view of the radar sensor which is in reality caused by the multiple reflections at one or more items or parts within the interior of the vehicle. Since the radar sensor detects a non-existing object in such a situation, the false positive being due to multiple reflections of a radar signal may also be called a "ghost target" or "internal ghost".

In order to assess the possibility for the occurrence of false positives or internal ghosts, tests on vehicles have been performed so far. However, these tests are possible only in a very late design stage of the vehicle in order to detect false positives in a vehicle which is as similar as possible to a vehicle being actually delivered to a customer. However, changes in the hardware of the vehicle in order to counteract the occurrence of false positives are very expensive or even impossible in a very late stage of the vehicle design. For performing vehicle tests in order to simulate the worst case for the occurrence of false positives, the bumper and some parts within the interior of the vehicle may be covered with foils or paint. This implies an additional effort for the vehicle tests. In order to keep the effort for the tests within reasonable limits, no variations are usually considered regarding the materials of the foils or of the paint.

Accordingly, there is a need for a method being suitable to predict the probability for an occurrence of a false positive in a predefined region, especially in an interior of a vehicle.

SUMMARY

In one aspect, the present disclosure is directed at a computer implemented method for predicting a false positive for a radar sensor emitting a radar signal in a desired field of view, wherein the false positive is to be predicted for a predefined region located outside the desired field of view. According to the method, geometrical data is received for at least one item within the predefined region. A position of the radar sensor is defined, and a plurality of primary rays representing the radar signal is calculated. Each primary ray has a primary energy level and originates from the position of the radar sensor. A plurality of reflected rays is calculated based on the plurality of primary rays and based on the geometrical data, wherein each reflected ray originates from a respective reflection point on the at least one item and is a reflection of one of the primary rays or a reflection of another reflected ray. Detectable rays are selected from the reflected rays, wherein the detectable rays arrive at the position of the radar sensor. A conductivity of the at least one item is estimated in order to determine a reflectivity of the item based on the conductivity. An energy level is determined for each detectable ray based on the reflectivity of the at least one item and based on the respective primary energy level, and a clustering level for the detectable rays is determined based on distances of the respective reflection points of the detectable rays. Finally, a probability for an occurrence of a false positive is estimated based on the energy level and the clustering level of the detectable rays.

The predefined region which may cause the false positive for the radar sensor may be an interior or compartment of a vehicle if the radar sensor is installed at a front or a rear of the vehicle, for example. The geometrical data for the at least one item within the predefined region may comprise CAD data for the at least one item, e.g. for one or more parts within an interior of a vehicle. The geometrical data may therefore comprise realistic construction data e.g. for a vehicle being available in a design stage of the vehicle already.

Instead of performing expensive vehicle tests, the method calculates rays for simulating a radar signal in order to predict a false positive for the radar sensor. In addition, the simulation method may be applied in a very early design stage in which hardware modifications, e.g. of a vehicle, can be performed at low cost. As a consequence, the number of expensive tests, e.g. at a vehicle in a very late design stage, may be minimized. Therefore, the simulation method for predicting a false positive may improve the quality of radar integration in vehicles. Furthermore, the functional safety of the vehicle may be improved due to the higher quality of radar integration.

The method may comprise one or more of the following features. A subset of the plurality of reflected rays may be identified based on a maximum number of multiple reflections and based on a maximum number of rays for each number of multiple reflections, and the detectable rays may be selected from the subset of the reflected rays. A respective number of reflections may be associated to each reflected ray, and a reflected ray may belong to the subset only if its number of reflections is smaller than or equal to the maximum number of reflections. A respective number of reflected rays may be counted for each number of multiple reflections, and the subset may be selected from the plurality of reflected rays such that each number of reflected rays for each number of multiple reflections is smaller than or equal to the maximum number of rays for each number of multiple reflections. The subset of the plurality of reflected rays may further be identified by selecting primary rays and reflected rays having an angle difference being constant within a predetermined tolerance such that the primary rays and reflected rays uniformly cover the predefined region.

Furthermore, the method may also comprise one or more of the following features. The plurality of primary rays may be calculated such that the primary rays are reflected at a reflector within the desired field of view of the radar sensor before entering the predefined region. A distance of at least one predicted false positive with respect to the position of the radar sensor may be estimated based on the energy level and the clustering level of the detectable rays if the probability for the occurrence of a false positive exceeds a predetermined threshold. Estimating the probability for the occurrence of a false positive may comprise comparing the energy level with an energy threshold being dependent on a distance from the position of the radar sensor.

Moreover, the method may also comprise one or more of the following features. The clustering level for the detectable rays may be determined based on a number of detectable rays having distances of their reflection points which are smaller than a predefined distance threshold. The distance threshold may be dependent on a distance of the reflections points with respect to the position of the radar sensor. A critical path being related the occurrence of a false positive may be estimated based on the energy level and the clustering level of the detectable rays. The geometrical data for the at least one item may modified by a predetermined geometrical tolerance in order to determine modified geometrical data, and the steps of calculating the plurality of reflected rays, selecting the detectable rays from the reflected rays and determining energy and clustering levels for the detectable rays may be repeated based on the modified geometrical data in order to estimate a modified probability for the occurrence of a false positive. The conductivity of the at least one item may be calculated based on a predefined composition of the at least one item.

According to an embodiment, a subset of the plurality of reflected rays is identified based on a maximum number of multiple reflections and based on a maximum number of rays for each number of multiple reflections. The detectable rays may be selected from the subset of the reflected rays.

The identification of the subset of the reflected rays may be regarded as "down selection" within the plurality of reflected rays by restricting the number of multiple reflections and the number of rays which are taken into account for the estimation of the probability for the occurrence of the false positive. Due to this restriction, the time for performing the method and the required computational effort are strongly reduced. If the occurrence of a false positive is to be predicted e.g. for an interior of a vehicle comprising many items having a complex geometry, the "down selection" for reducing the number of calculated rays due to the identification of the subset of a plurality of reflected rays may be a prerequisite for performing the method within a reasonable time frame at all.

A respective number of reflections may be associated to each reflected ray. A reflected ray may belong to the subset only if its number of reflections is smaller than or equal to the maximum number of reflections. The number of reflections to be considered may be approximately 75. Thus, reflected rays which are the result of many multiple reflections are neglected by the simulation method since these rays will probably have a very low energy level, or may not add additional required information for the ghost target risk assessment.

In addition, a respective number of reflected rays may be counted for each number of multiple reflections. The subset may be selected from the plurality of reflected rays such that each number of reflected rays for each number multiple reflections is smaller than or equal to the maximum number of rays for each number of multiple reflections. That is, the respective number of rays being reflected twice, thrice, four times etc. is restricted to the maximum number of rays. For example, the total number of rays being considered for a double reflection, triple reflection etc. may each be approximately 1500. Due to this restriction for the total number of rays to be considered, the computational effort for the method is decreased again. On the other hand, the maximum number of rays may be selected to be large enough for covering the predefined region properly.

In order to cover the predefined region uniformly by the primary and reflected rays, the subset of the plurality of reflected rays may further be identified by selecting primary rays and reflected rays having an angle difference being constant within a predetermined tolerance. Since the predefined region is uniformly covered due to the substantially constant angle difference between the rays, the risk to miss a false positive within the predefined region is minimized. On the other hand, the computational effort of the method is decreased again since reflected rays having a very small angle difference may be neglected.

The plurality of primary rays may be calculated such that the primary rays are reflected at a reflector within the desired field of view of the radar sensor before entering the predefined region. The reflector within the desired field of view of the radar sensor may be a bumper of a vehicle, for example. The rays being reflected by the reflector within the desired field of view of the radar sensor may still be regarded as primary rays when they are entering the predefined region. Since the reflector within the desired field of view may be taken into account by the simulation method, properties of a "source" for multiple reflections of the radar signal may also be considered by the method. Thus, the simulation method may be suitably adapted to realistic scenarios. For example, different materials or paintings and different geometrical properties of a bumper of a vehicle may be taken into account by the method in order to minimize the probability for the occurrence of false positives.

According to a further embodiment, the distance of at least one predicted false positive with respect to the position of the radar sensor is estimated based on the energy level and the clustering level of the detectable rays if the probability for the occurrence of a false positive exceeds a predetermined threshold. If a distance of a false positive is known, the item or part generating this false positive may be modified in order to reduce the probability of the occurrence of the false positive. For example, geometrical or material properties of the item or part within the predefined region may be changed in a suitable manner.

Estimating the probability for the occurrence of a false positive may comprise that the energy level may be compared with an energy threshold which is additionally dependent on a distance from the position of the radar sensor. In order to estimate the energy level of a detectable ray, the propagation of the electrical field of the radar signal starting from the position of the radar sensor may be calculated, and the energy level may be calculated in a known manner from the electrical field. By the comparison of the energy level with an energy threshold for each detectable ray relevant rays may be distinguished from rays having a too low energy level for producing a false positive even if their distances correspond to a high clustering level. The dependence of the energy threshold on the distance from the position of the radar sensor may reflect the propagation of the electrical field within the predefined region. In addition, the energy threshold may have a high value for a short distance from the position of the radar sensor and a lower value for larger distances from the position of the radar sensor.

The clustering level for the detectable rays may be determined based on a number of detectable rays having distances of their reflection points which are smaller than a predefined distance threshold. If the predefined region is an interior of a vehicle, the distance threshold may be in a distance of a few millimeters or centimeters. The clustering level of the detectable rays therefore corresponds to a certain number of rays which have a similar path within the predefined region since the distances between their reflection points is smaller than the threshold. The number of detectable rays being required for a certain clustering level may be an adjustable parameter for the simulation method. In addition, the distance threshold may depend on a distance of the reflection points with respect to the position of the radar sensor. For example, the distance threshold may be small for short distances and may become larger if the distance from the radar sensor becomes larger as well.

According to a further embodiment, a critical path being related to the occurrence of the false positive may be estimated based on the energy level and the clustering level of the detectable rays. The calculation of the plurality of primary rays and reflected rays allows tracking of the rays within the predefined region. Therefore, the method may not only determine the probability for the occurrence of a false positive, but it may also allow to track the path along which the false positive is created. The knowledge of the critical path may allow a suitable modification of the at least one item within the predefined region in order to minimize the probability for the occurrence of the false positive.

The geometrical data for the at least one item may be modified by a predetermined geometrical tolerance in order to determine modified geometrical data. For example, CAD data for an interior of a vehicle may have some tolerance which may be taken into account. Based on the modified geometrical data, the steps of the method may be repeated, i.e. calculating the plurality of reflected rays, selecting the detectable rays from the reflected rays and determining energy and clustering levels for the detectable rays. Based on these repeated steps of a method, a modified probability for the occurrence of a false positive may be estimated. It turned out that the occurrence of false positives may be sensitive on slight modifications of the geometry within the predefined region. In addition, repeating the steps of a method for slightly modified geometrical data may be a check for the stability of the simulation method.

In another aspect, the present disclosure is directed at a computer system, said computer system being configured to carry out several or all steps of the computer implemented method described herein.

The computer system may comprise a processing unit, at least one memory unit and at least one non-transitory data storage. The non-transitory data storage and/or the memory unit may comprise a computer program for instructing the computer to perform several or all steps or aspects of the computer implemented method described herein.

In another aspect, the present disclosure is directed at a non-transitory computer readable medium comprising instructions for carrying out several or all steps or aspects of the computer implemented method described herein. The computer readable medium may be configured as: an optical medium, such as a compact disc (CD) or a digital versatile disk (DVD); a magnetic medium, such as a hard disk drive (HDD); a solid state drive (SSD); a read only memory (ROM), such as a flash memory; or the like. Furthermore, the computer readable medium may be configured as a data storage that is accessible via a data connection, such as an internet connection. The computer readable medium may, for example, be an online data repository or a cloud storage.

The present disclosure is also directed at a computer program for instructing a computer to perform several or all steps or aspects of the computer implemented method described herein.

DRAWINGS

Figure 2:
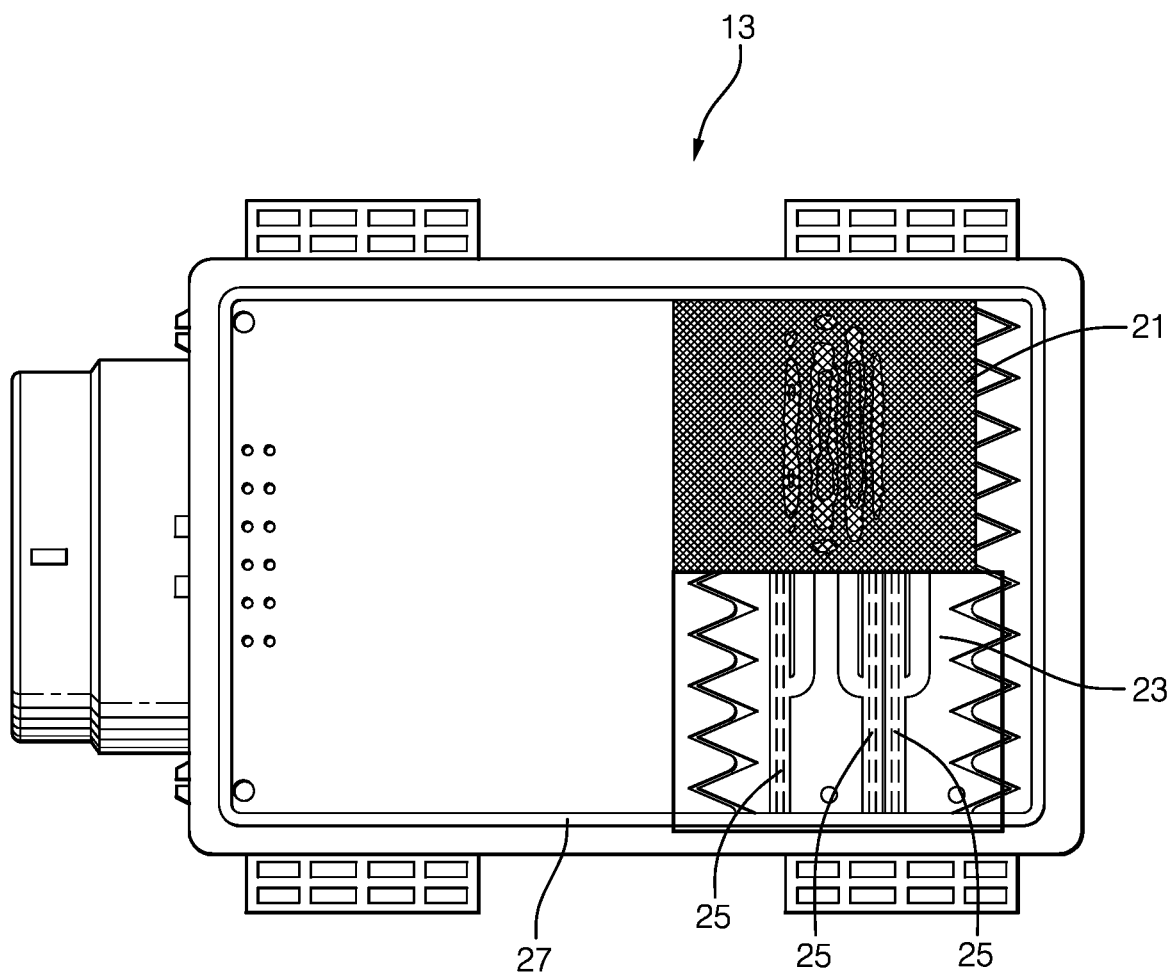
Figure 3:
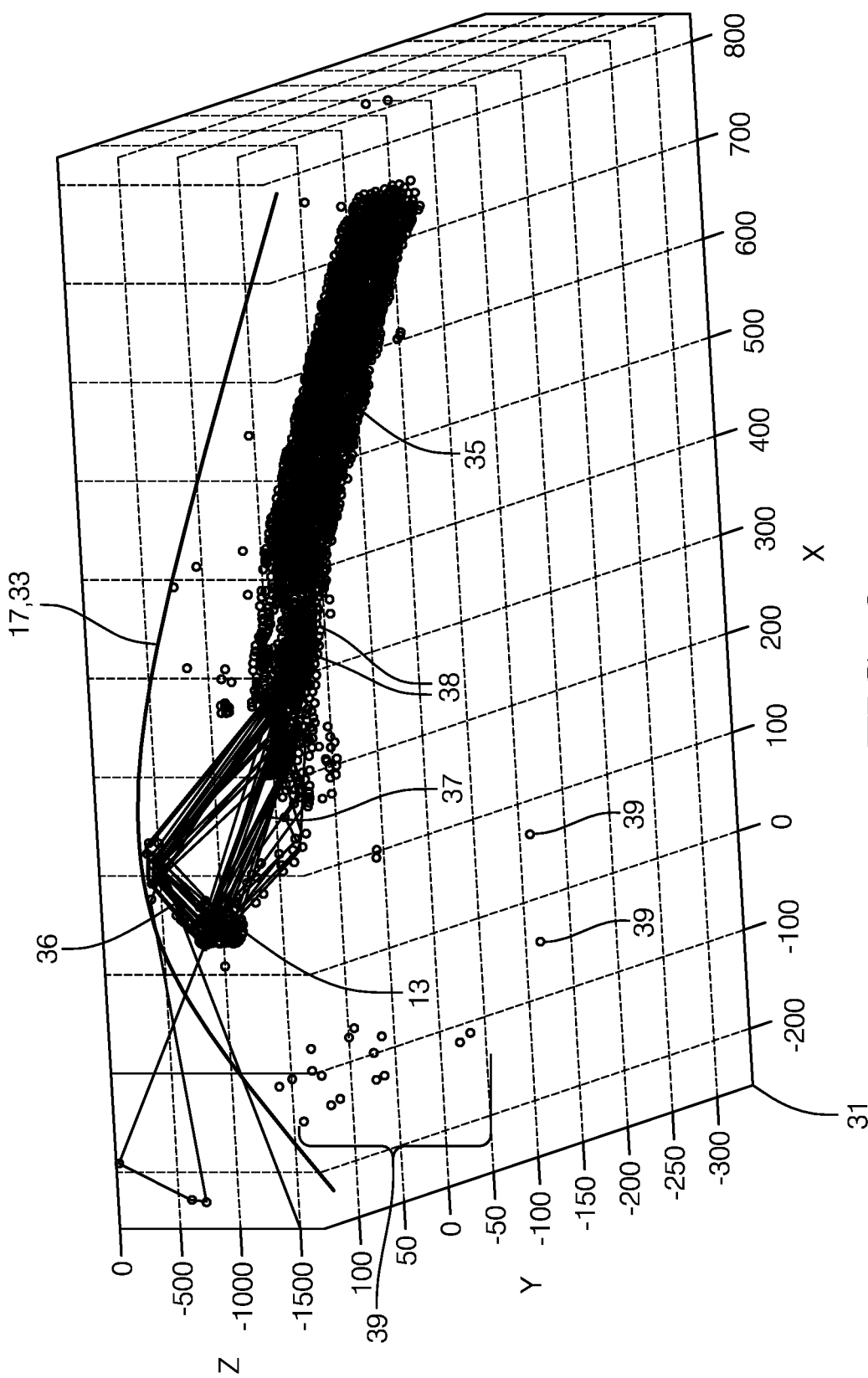
Figure 4:
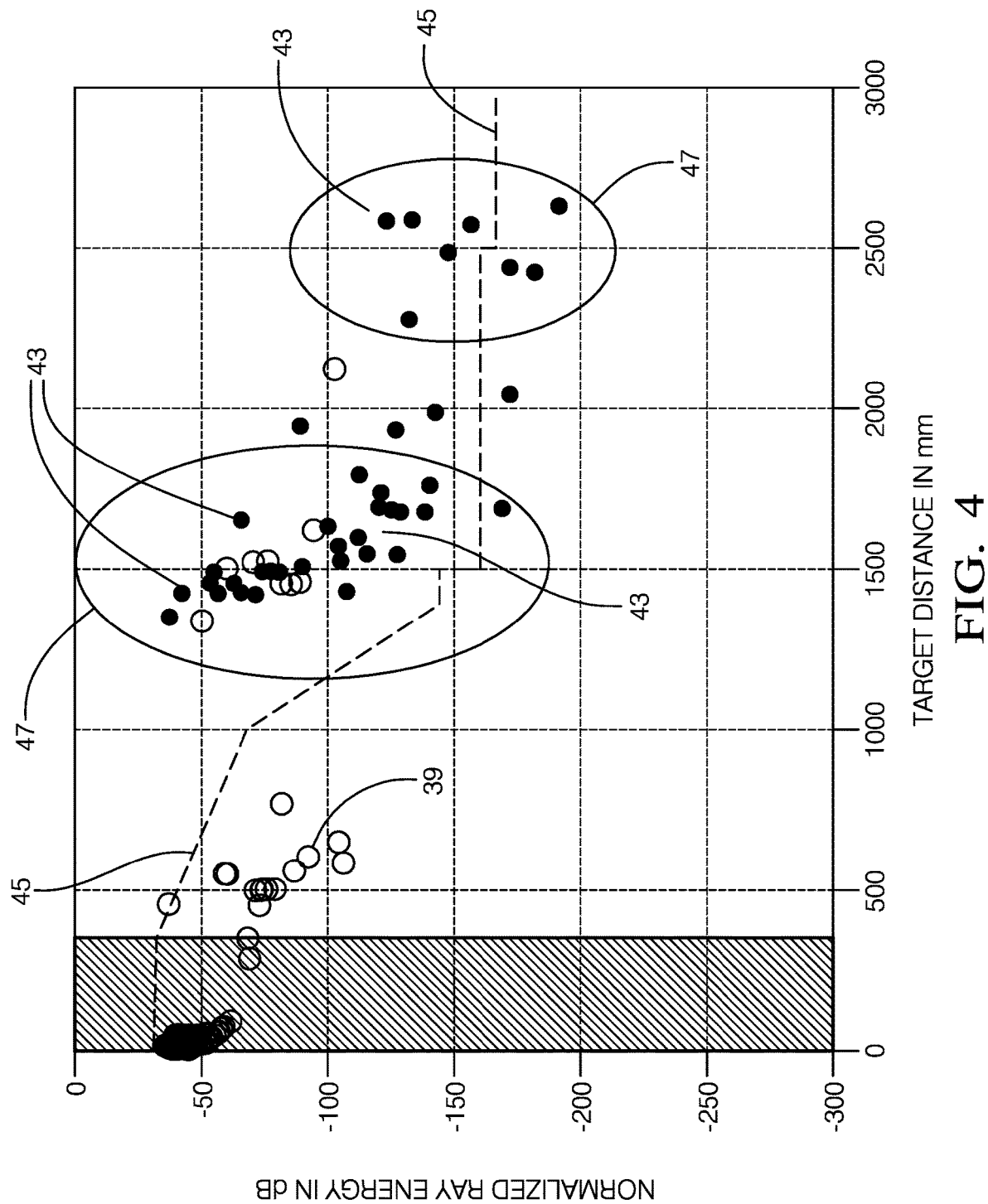
Figure 5:
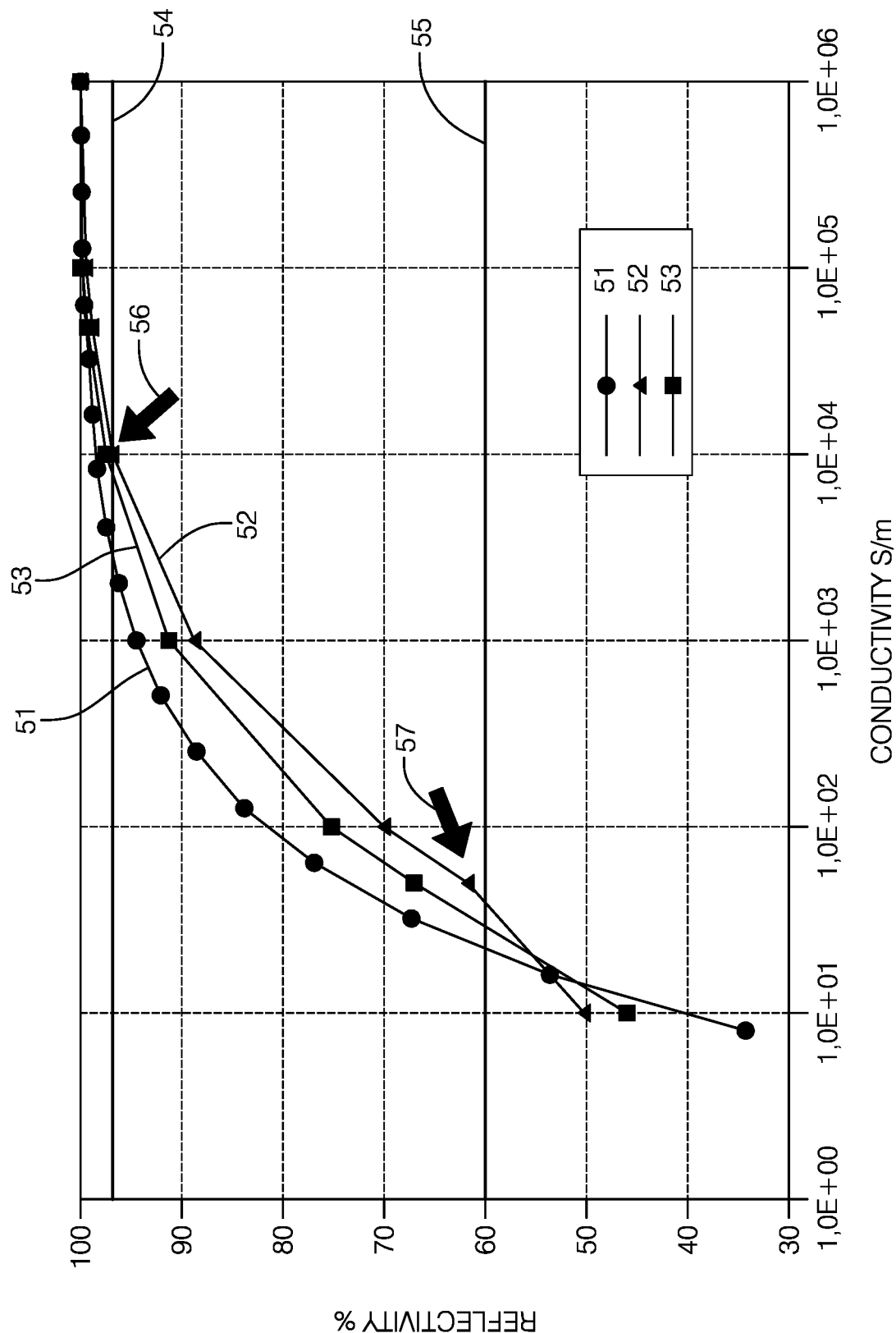

Exemplary embodiments and functions of the present disclosure are described herein in conjunction with the following drawings:

FIG. 1 schematically depicts an exemplary vehicle comprising a radar sensor,

FIG. 2 schematically depicts an interior of a radar sensor schematically,

FIG. 3 schematically depicts a calculation of rays for a radar system within a three-dimensional coordinate system, FIG. 4 schematically depicts a normalized ray energy as a function of the distance from the position of a radar sensor, and FIG. 5 schematically depicts simulation results for the reflectivity over conductivity.

DETAILED DESCRIPTION

FIG. 1 depicts a vehicle 11 comprising a radar sensor 13 for monitoring an environment of the vehicle 11. The radar sensor 13 emits a radar signal 15 within a desired field of view of the radar sensor 13. If the radar signal 15 is reflected by an object within the desired field of view, properties of the object can be derived from the reflected radar signal being detected by the radar sensor 13. For example, the distance and/or the velocity of the object may be determined relative to the vehicle 11.

The vehicle 11 further comprises a bumper 17 being mounted at the front of the vehicle 11. The bumper 17 may also be a reflector for the radar signal 15, i.e. a portion of the radar signal 15 may be reflected by the bumper 17 towards an interior 19 of the vehicle 11. The interior 19 may comprise an engine compartment and a passenger compartment of the vehicle 11. Furthermore, the interior 19 of the vehicle 11 may be regarded as a predefined region outside the desired field of view of the radar sensor 13. Within this predefined region 19, the radar signal 15 being reflected by the bumper 17 may additionally be reflected by one or more items or parts and eventually detected by the radar sensor 13.

The multiple reflections of the radar signal 15 within the predefined region 19, i.e. within the interior 19 of the vehicle 11 outside the desired field of view of the radar sensor 13, may cause a detection of an object at a distance or position with respect to the radar sensor 13 where actually no real object is located. Such a detection of a "false object" due to the multiple reflections may be called "false positive", "ghost target" or "internal ghost" if the detection is due to multiple reflection within the interior 19 of the vehicle 11.

FIG. 2 is a schematic illustration of the interior of the radar sensor 13. In the upper right part of the radar sensor 13, a radar source or emitting device 21 is depicted. In the lower right part, a receiving device 23 is shown which comprises for example three radar antennas 25. The emitting device 21 and the receiving 23 are surrounded by a housing 27.

The geometrical dimensions and the location of the radar sensor 13 are used as a basis for a simulation method for predicting a false positive created by the interior 19 of the vehicle 11 (see FIG. 1) according to the disclosure. As indicated by the structure of the emitting device 21, a full wave simulation is used for the emitting device or radar source 21, i.e. a full solution of the Maxwell equations describing the electrical field of the radar signal. This source could be defined by one or more near field sources or one or more far field sources. Furthermore, the receiving characteristics of the antennas 25 are considered as well.

FIG. 3 depicts a result of the computer-implemented method for predicting a false positive for the radar sensor 13 according to the disclosure. The radar sensor 13 is positioned at the origin of a three-dimensional coordinate system 31 having an x-axis, a y-axis and a z-axis as shown in FIG. 3. Furthermore, the radar sensor 13 is assumed to be mounted at the front the vehicle 11 (see FIG. 1) behind the bumper 17 which is schematically illustrated in FIG. 3 by the curve 33. An item within the interior 19 of the vehicle 11 (see FIG. 1) is represented by a reflective hollow profile 35 which is also located behind the bumper 17 within the interior 19 of the vehicle.

For the computer-implemented method, CAD data of the reflective hollow profile 35 is received. In addition, a conductivity of the reflective hollow profile 35 is estimated as will be explained in detail in context of FIG. 5. Based on the conductivity of the reflective hollow profile 35, its reflectivity is determined for radar signals being emitted by the radar sensor 13.

A plurality of primary rays 36 is calculated originating from the position of the radar sensor 13 and propagating toward the bumper 17 within a desired field of view of the radar sensor 13. A portion of the primary rays 36 is reflected by the bumper 17, i.e. in a region close to the curve 33 as shown in FIG. 3. The reflected primary rays 36 are further reflected once or multiple times at the structure of the reflective hollow profile 35 at reflection points 38. The reflection points 38 are located at a surface (not shown) of the reflective hollow profile 35. Therefore, the reflective hollow profile 35 creates a plurality of reflected rays 37.

A portion of the reflected rays 37 may be reflected by the reflective hollow profile 35 such that these rays arrive at the radar sensor 13 again. The reflected rays 37 arriving at the radar sensor 13 may be regarded as detectable rays. If the number of detectable rays and an energy level of these rays are large enough, a false positive may be created at the position of the radar sensor 13. That is, due to the multiple reflections of the reflected rays 37 the reflective hollow profile 35 is detected by the radar sensor 13 as a false object at a distance in front of the bumper 17, i.e. in front of the vehicle 11 (see FIG. 1). In other words, the reflective hollow profile 35 creates false positives or internal ghosts for the radar sensor 13.

The calculation of the primary rays 36 and the reflected rays 37 is based on a simulation method called "shooting and bouncing rays (SBR)" which is usually applied for the simulation of radar cross sections outside of vehicles in very large scale scenarios. This method has not been applied so far for the internal reflection of radar signals in a vehicle due to the complexity of the calculation for such scenarios. The calculation of the rays 36, 37 is based on a radar frequency of 76.5 GHz.

In order to perform the method of shooting and bouncing rays (SBR) for the interior 19 of the vehicle 11 (see FIG. 1), a procedure of "down selecting" of the rays 36, 37 is used. In detail, a maximum number of multiple reflections being considered is restricted to approximately 75. In addition, the number of rays being considered for each number of multiple reflections is restricted to a maximum number, e.g. 1500. That is, a maximum of 1500 rays is considered for each of two reflections, three reflections, four reflections, etc. of the primary rays 36. Furthermore, such rays are considered within the simulation method only which have an approximately constant angle difference in order to cover a region of interest uniformly. i.e. the predefined region 19. Due to this "down selection" of the rays 36, 37, the total number of rays which need to be considered is reduced approximately by a factor of 1000. This makes the method according to the disclosure feasible for realistic scenarios. On the other hand, due to the uniform covering of the predefined region the risk to miss a false positive is minimized. In other words, the interior 19 of a vehicle is fully illuminated by the rays 36, 37 in spite of the down selection as described above.

According to the method of shooting and bouncing rays (SBR), the electrical field is also tracked along the rays. Based on the electrical field, an energy level may be estimated for each of the reflected rays 37 arriving at the position of the radar sensor 13. For the calculation of the energy level, the reflectivity of e.g. the reflective hollow profile 35 is taken into account as explained below in context of FIG. 5. The energy levels of the rays 37 as shown in FIG. 3 are depicted in FIG. 4 as a normalized ray energy in dB over the distance with respect to the position of the radar sensor 13. This distance is shown in mm in FIG. 4.

In addition, a clustering level is calculated for the rays 36, 37. As subset of the rays 37 arriving at the radar sensor 13 is regarded as a cluster of rays if the reflection points 38 of the rays 37 have distance from each other which is smaller than a predefined distance. In other words, the rays belonging to a cluster are propagating on almost the same path. The rays which fulfil this condition, i.e. which are reflected by the reflective hollow profile 35 as a cluster, are depicted in FIG. 4 as clustered rays 43 having star symbols. In contrast, the rays 37 which do not fulfil this clustering condition are depicted as minor reflections 39 shown as small circles in FIGS. 3 and 4.

In order to identify a false positive based on the simulated rays 37, the energy levels of the clustered rays 43 has additionally to be considered. For the normalized ray energy, an energy threshold 45 is defined which is shown in FIG. 4 as a function of the distance with respect to the position of the radar sensor 13. The energy levels of the clustered rays 43 have to be above the energy threshold 45 in order to be an indication of a false positive. In FIGS. 3 and 4, additional minor reflections 39 are shown which do not fulfil the clustering condition as described above although their energy level is partly above the energy threshold 45. Therefore, the minor reflections 39 are not considered as an indication of a false positive.

Based the clustering level, i.e. the number of rays belonging to each cluster 43 and based on the energy levels of the rays belonging to the respective cluster a probability for the occurrence of a false positive may be estimated. As shown in FIG. 4, the clustered rays 43 surrounded by a respective ellipse 47 provide a strong indication of a false positive.

Furthermore, the distances for two false positives or "internal ghosts" with respect to the position of the radar sensor 13 may be derived from the clustered rays 43 within the respective ellipse 47 as shown in FIG. 4. Moreover, since the reflected rays 37 are tracked by the simulation method as shown in FIG. 3, a respective critical path can be derived from the illustration as shown in FIG. 3 for the false positives as identified by the clustered rays 43 within the ellipses 47 as shown in FIG. 4. The respective critical path may be used e.g. for a new design or a replacement of the reflective hollow profile in an early design stage of the vehicle 11.

In FIG. 5, the reflectivity in percent is depicted as a function of the conductivity in S/m (Siemens per meter) which may be used for metal parts or bumpers within a vehicle, e.g. the bumper 17 of the vehicle 11 (see FIG. 1). The curve 51 depicts the theoretical relation between reflectivity and conductivity according to the theory of Hagen-Rubens. In addition, two curves 52, 53 are shown which are the result of a simulation by the method for shooting and bouncing rays (SBR) for the reflectivity. The curve 52 represents the average for a triple reflection using a corner reflector, whereas the curve 53 is based on a double reflection at a metal plate. As can be seen in FIG. 5, there is a good agreement between the theoretical curve 51 according to the Hagen-Rubens relation and the curves 52, 53 for the simulation results.

Moreover, the line 54 represents an average assumed reflectivity of 97% for metal parts, whereas the line 55 represents a reflectivity of 60% which is assumed as a worst case for the reflectivity of the bumper 17. As indicated by the arrow 56, the simulation provides the correct reflectivity of the 97% for a lossy metal having a conductivity of $10^4$ S/m. For a lossy material having a conductivity of $5 \times 10^1$ S/m which is typically used in a bumper 17, the simulation provides a reflectivity of approximately 65% which is in good agreement with the reflectivity of 60% assumed as worst case. In summary, the results of FIG. 5 show that the theoretical relation according to Hagen-Rubens 51 may be a good approximation being used within the simulation method for predicting false positives.

The simulation methods as described above may comprise parameters for fine tuning, e.g. the energy threshold 45 as shown in FIG. 4 being a function of the distance with respect to the position of the radar sensor 13, the predetermined distance for defining the clustering of the rays etc. These parameters for fine tuning of the simulation method may be determined by a comparison with the results of vehicle tests, i.e. by measurements within a vehicle comprising the radar sensor 13.

The preceding description is exemplary rather than limiting in nature. Variations and modifications to the disclosed examples may become apparent to those skilled in the art that do not necessarily depart from the essence of this invention. The scope of legal protection given to this invention can only be determined by studying the following claims.

I claim:

1. A computer implemented method for predicting a false positive for a radar sensor emitting a radar signal in a desired field of view, wherein the false positive is to be predicted for a predefined region located outside the desired field of view, the method comprising:

receiving geometrical data for at least one item within the predefined region, defining a position of the radar sensor, calculating a plurality of primary rays representing the radar signal,
wherein each primary ray has a primary energy level and originates from the position of the radar sensor, calculating a plurality of reflected rays based on the plurality of primary rays and based on the geometrical data, wherein each reflected ray originates from a respective reflection point at the at least one item and is a reflection of one of the primary rays or a reflection of another reflected ray, selecting detectable rays from the reflected rays, wherein the detectable rays arrive at the position of the radar sensor, estimating a conductivity of the at least one item in order to determine a reflectivity of the item based on the conductivity, determining an energy level for each detectable ray based on the reflectivity of the at least one item and based on the primary energy level of the primary ray that the detectable ray is based on, determining a clustering level for the detectable rays based on distances of the respective reflection points of the detectable rays, and estimating a probability for an occurrence of a false positive based on the energy level and the clustering level of the detectable rays.

2. The method according to claim 1, comprising:

identifying a subset of the plurality of reflected rays based on a maximum number of multiple reflections and based on a maximum number of rays for each number of multiple reflections, and selecting the detectable rays from the subset of the reflected rays.

3. The method according to claim 2, wherein a respective number of reflections is associated to each reflected ray and a reflected ray belongs to the subset only if its number of reflections is smaller than or equal to the maximum number of reflections.

4. The method according to claim 2, wherein a respective number of reflected rays is counted for each number of multiple reflections and the subset is selected from the plurality of reflected rays such that each number of reflected rays for each number of multiple reflections is smaller than or equal to the maximum number of rays for each number of multiple reflections.

5. The method according to claim 2, wherein the subset of the plurality of reflected rays is identified by selecting primary rays and reflected rays having a constant angle difference within a predetermined tolerance such that the primary rays and reflected rays uniformly cover the predefined region.

6. The method according to claim 1, wherein the plurality of primary rays is calculated such that the primary rays are reflected at a reflector within the desired field of view of the radar sensor before entering the predefined region.

7. The method according to claim 1, wherein a distance of at least one predicted false positive with respect to the position of the radar sensor is estimated based on the energy level and the clustering level of the detectable rays if the probability for the occurrence of a false positive exceeds a predetermined threshold.

8. The method according to claim 1, wherein estimating the probability for the occurrence of a false positive comprises comparing the energy level with an energy threshold which is dependent on a distance from the position of the radar sensor.

9. The method according to claim 8, wherein the distance threshold is dependent on a distance of the reflection points with respect to the position of the radar sensor.

10. The method according to claim 1, wherein the clustering level for the detectable rays is determined based on a number of detectable rays having distances of their reflection points which are smaller than a predefined distance threshold.

11. The method according to claim 1, wherein a critical path related to the occurrence of a false positive is estimated based on the energy level and the clustering level of the detectable rays.

12. The method according to claim 1, comprising:
modifying the geometrical data for the at least one item by a predetermined geometrical tolerance in order to determine modified geometrical data, and
repeating the steps of calculating the plurality of reflected rays, selecting the detectable rays from the reflected rays and determining energy and clustering levels for the detectable rays based on the modified geometrical data in order to estimate a modified probability for the occurrence of a false positive.

13. The method according to claim 1, comprising determining the conductivity of the at least one item based on a predefined composition of the at least one item.

14. A computer system configured to carry out the computer implemented method of claim 1.

15. A non-transitory computer readable medium comprising instructions for carrying out the computer implemented method of claim 1.

* * * * *